Oct. 28, 1969   D. M. FLETCHER ET AL   3,475,118
PRODUCTION OF STRONGER HNO₃ BY COPRODUCING WEAKER HNO₃
Filed Nov. 1, 1966
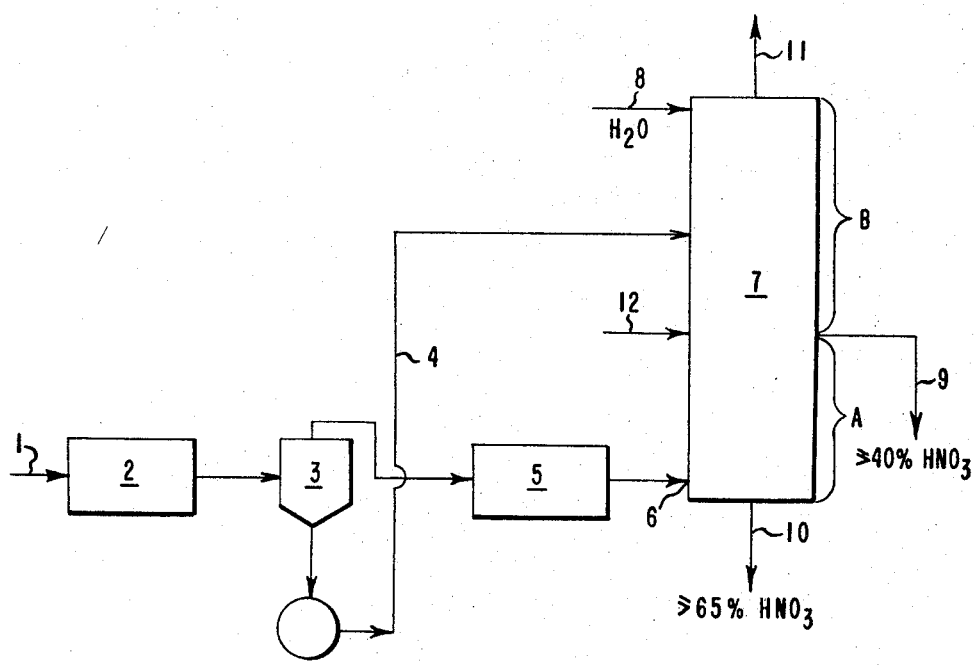
INVENTORS
DAVID M. FLETCHER
MARTIN M. WENDEL
BY *[signature]*
ATTORNEY

United States Patent Office 3,475,118
Patented Oct. 28, 1969

3,475,118
PRODUCTION OF STRONGER $HNO_3$ BY COPRODUCING WEAKER $HNO_3$
David M. Fletcher, Sewell, N.J., and Martin M. Wendel, Glen Mills, Pa., assignors to E. I. du Pont de Nemours and Company, Wilmington, Del., a corporation of Delaware
Filed Nov. 1, 1966, Ser. No. 591,202
Int. Cl. C01b 21/40
U.S. Cl. 23—157          5 Claims

ABSTRACT OF THE DISCLOSURE

Aqueous nitric acid having a concentration of about from 40 to 65% $HNO_3$ is withdrawn from an intermediate portion of an absorption system so that the system will produce nitric acid of higher strength (at least about 65% $HNO_3$) than can be produced when the same system is operating at the same temperature, pressure and capacity and with the same efficiency to make only one strength of aqueous nitric acid.

---

All concentrations hereinafter referred to are weight percent unless otherwise specifically indicated.

The manufacture of about 50 to 62% nitric acid by catalytically oxidizing ammonia to produce a gaseous mixture containing nitric oxide (NO); cooling and oxidizing this mixture to convert most of the NO to nitrogen peroxide (defined herein as the equilibrium mixture of $NO_2$ and $N_2O_4$); and then absorbing the nitrogen peroxide in water in a countercurrent absorption tower containing a plurality of plates or trays fitted with bubble caps, is well established and broadly practiced in the chemical industry. The majority of this acid is used in oxidation reactions, e.g., the oxidation of p-xylene in the synthesis of terephthalic acid, either as 50–62% $HNO_3$ or after dilution with water to give strengths generally ranging down to about 40% $HNO_3$. A substantial need also exists for nitric acid having a strength greater than 62%, particularly 65%+ $HNO_3$, e.g., in nitration reactions such as those used for the production of explosives. This stronger acid is made either by concentrating about 60 to 62% $HNO_3$, e.g., by distillation or reaction with dehydrating agents, or by the more recently developed direct methods which generally require refrigerated cooling and/or high pressures and, in any event, represent a substantial deprature from conventional absorption tower operation.

The present invention resides in the discovery that if a sidestream of relatively weak acid is continuously withdrawn from a conventional absorption system, stronger nitric acid can be made in that system than could otherwise be produced, except by sacrificing considerable production capacity and/or absorption efficiency. In particular, the stronger acid will have a concentration of at least about 65% $HNO_3$, and equally important, the side stream will, itself, be of commercial utility, since it can have any desired strength within the range of about from 40% to 65% $HNO_3$. Thus, viewed as a whole, the subject process simultaneously and continuously meets both of the aforementioned needs, i.e., for relatively weak and also stronger $HNO_3$, and without requiring refrigeration, dehydrating agents or other costly expedients to produce the stronger nitric acid product.

The process of this invention comprises continuously:

(a) Passing a gaseous mixture containing nitrogen peroxide through a first reaction zone of an absorption system, said mixture initially containing, by weight, less than about 1% water and, by volume, at least 1% nitrogen oxides whose state of oxidation is at least about 95%;

(b) Introducing water or aqueous nitric acid containing up to about 5% $HNO_3$ into a second reaction zone of the absorption system;

(c) Passing the nitrogen peroxide-containing gaseous mixture from the first reaction zone through the second reaction zone countercurrently to the flow of aqueous nitric acid formed by absorbing nitrogen peroxide in water, while maintaining the second reaction zone at temperatures and pressures of about from 5 to 50° C. and 1 to 95 atmospheres, respectively, and above the dew point of the nitrogen peroxide;

(d) Withdrawing aqueous nitric acid having a concentration of about from 40 to 65% $HNO_3$ from the second reaction zone, i.e., from an intermediate portion of the absorption system at a rate sufficient to continuously remove at least about 12% of the total moles of reactive fixed nitrogen fed into the reaction zones;

(e) Passing the remainder of the aqueous nitric acid from said second zone through the first reaction zone countercurrently to the gaseous mixture of step (a), while maintaining the first reaction zone at temperatures and pressures of about from 5 to 50° C. and 1 to 95 atmospheres, respectively, and above the dew point of the nitrogen peroxide; and (f) Removing aqueous nitric acid having a concentration of at least about 65% $HNO_3$ from the first reaction zone, said acid being stronger than the acid withdrawn in step (d) and containing up to about 88% of said fixed nitrogen.

As used herein, percent "state of oxidation" is defined by the formula:

$$\frac{(NO_2 + 2N_2O_4) \, 100}{NO + NO_2 + 2N_2O_4}$$

and "nitrogen oxides" means the principal oxides $NO_2$, $N_2O_4$ and NO. The term "reactive fixed nitrogen" denotes "nitrogen oxides" plus $HNO_3$. The total moles of reactive fixed nitrogen fed to the reaction zones is the sum of the moles fed to the absorption system from without and thus includes the nitrogen peroxide and NO in the feed gas of step (a), any $HNO_3$ and dissolved nitrogen oxides fed to the top of the second reaction zone with the water of step (b), as well as the nitrogen oxides and $HNO_3$ in any bleacher off-gas and weak $HNO_3$ condensate, e.g., from cooler-condensers, etc., that is introduced into one or the other of the reaction zones.

The above process is capable of achieving high yields and the same rate of production the absorption column will provide when operated without sidestream withdrawal. Apropros of yields, 94% or more of the reactive fixed nitrogen fed to the absorption system is easily converted to equivalent $HNO_3$; thus, the process off-gas (usually referred to as tail or stack gas) will contain 6% or less or the reactive fixed nitrogen. Normally, the process will be operated at conventional pressure process efficiencies of about 96% or above so that the stack or yield loss of reactive fixed nitrogen is less than about 4% of the reactive fixed nitrogen fed to the column. Regarding production rates, the above yields can be realized while producing the same total amount of $HNO_3$, expressed as equivalent tons per day of 100% $HNO_3$, as would be produced by the same absorber operating at capacity (i.e., at maximum rate to produce the strongest possible acid) but without sidestream removal of weak $HNO_3$. Actually, the only limitation on total production is that imposed by the absorption column itself. Consequently, the process rate will normally be at least about 95%, preferably at least about 98%, of equipment capacity, as is typical in the nitric acid industry. It is seen, therefore, that in the instant process simultaneously produces acids having a strength of at least about 40% and 65%, respectively, without sacrificing either yield or production capacity.

Reference is now made to the accompanying drawing, which schematically exemplifies the process of the invention as well as a method of preparing typical nitrogen oxide-containing gases for use in the subject process. Although the ensuing description is of the preferred absorption system, wherein the first and second reaction zones are different sections of a single absorption column, it is to be understood that these two zones could be two separate columns functionally interrelated as above and hereinafter indicated.

Entering the system at 1 is a hot gaseous mixture containing nitrogen oxides, oxygen and water, e.g., the product of a conventional ammonia oxidation unit. This gaseous mixture, which has a temperature substantially above 100° C., enters cooler-condenser 2 wherein water contained in the gas phase is condensed while maintaining the gas temperature above the dew point of nitrogen peroxide. The resulting two-phase mixture of gas and condensed weak acid-water is then fed into separator 3 in which the liquid condensate is separated from the gas phase with minimum absorption of the gases into the liquid phase. This dilute acid condensate may be removed from the system, but preferably is pumped to a point 4 in absorption column 7 where the acid strength of the dilute nitric acid countercurrently flowing down the column substantially equals that of the condensate pumped in. The $HNO_3$ and dissolved $NO_2$ in this condensate constitute part of the total reactive fixed nitrogen fed to the absorption system. From the separator, the gases pass through oxidizer 5, wherein oxidation of NO to nitrogen peroxide is carried to at least about 95% state of oxidation with air or oxygen, and then enter zone A of absorption column 7 at point 6 which is below the column's bottom absorption plate.

If a nitrogen oxide gas stream having a high state of oxidation is available from a source other than ammonia oxidation process gas, these gases may be introduced directly into zone A of the column, omitting all previous steps. Also, the nitrogen oxides may be provided by the off-gas of a unit wherein p-xylene is oxidized with $HNO_3$ to give terephthalic acid. Generally, such off-gas has a temperature of about 50° C., and contains substantially less than 1% water, by weight, and at least about 50%, by volume, nitrogen oxides (mainly NO); therefore, these gases only need be cooled and mixed with air in oxidizer 5 to increase their state of oxidation to at least about 95% before they are introduced into the absorption column, i.e., they need not be passed through cooler-condenser 2 or separator 3. Irrespective of the source of nitrogen oxides, the gaseous mixture entering the absorption column at 6 should contain, by volume, at least 1% (preferably about from 5 to 10%) nitrogen oxides and less than about 1% $H_2O$, by weight, and the state of oxidation of the nitrogen oxides should be at least about 95%, preferably at least about 98%. The equipment needed to prepare such gaseous mixtures from any of the above-described sources of nitrogen oxides is within the skill of the nitric acid art.

Column 7 contains a plurality of water-cooled bubble cap trays and is of the design conventionally used in the well-known pressure process for producing nitric acid. Where desired, an existing column designed to produce 50 to 62% nitric acid can be adapted to the practice of this invention, simply by providing the column with a sidestream takeoff.

While gases having a high state of oxidation enter reaction zone A of the absorber at 6, an aqueous stream enters the top of reaction zone B at 8. Although this stream generally will be substantially pure water, an aqueous nitric acid solution having a concentration of up to about 5% $HNO_3$ may be used. The nitrogen oxide gases passing upward countercurrently through zone A of column 7 are contacted by a liquid stream of nitric acid coming from zone B while part of the zone B product is withdrawn from the system as sidestream 9. This product stream and the acid entering zone A are of the same composition, viz., at least about 40% $HNO_3$. The flow rate of stream 9 is such that at least about 12% of the total moles of reactive fixed nitrogen fed to zones A and B from an external source is removed from the column as 40% $HNO_3$.

During the ensuing countercurrent flow through zone A of the now reduced quantity of aqueous $HNO_3$ and the gaseous mixture fed at 6, the nitrogen oxides content of the gases is reduced only slightly by absorption because there is a relatively large quantity of nitrogen oxides and a relatively small amount of aqueous $HNO_3$; however, the strength of the acid entering zone A is substantially increased to at least about 65% $HNO_3$ before it is removed from zone A as product stream 10. This stream contains up to about 88% of the reactive fixed nitrogen introduced at 4 and 6, and also 8 if weak acid instead of water is fed to the top of reaction zone B. The partially nitrogen oxides-stripped gas from zone A of the column then enters zone B wherein it is contacted countercurrently by water fed into the top of the column at point 8, which water substantially strips the gas stream of nitrogen oxides to form nitric acid that flows countercurrently down the column to provide the above-described acid sidestream 9 and the aqueous acid that is fed into the top of zone A, while the stripped gas (tail gas) containing up to 6% and usually less than about 4% of the reactive fixed nitrogen fed to the column, i.e., the remainder of the reactive fixed nitrogen, leaves the system at 11 for use in a power recovery unit or for other desired uses as will be obvious to those skilled in the art. Although it is not essential, both product acids are usually subjected to conventional air-stripping (i.e., bleaching) operations, and the two resulting streams of air mixed with nitrogen oxides (reactive fixed nitrogen) are introduced into the main nitrogen oxide process stream, e.g., where it enters zone B as indicated at 12, to avoid dilution of the gas entering at 6. The bleacher off-gas can be introduced at 6 if the resulting mixture of feed gas and off-gas will have the previously required minimum concentration of nitrogen peroxide.

In column 7, temperatures are maintained at about from 5 to 50° C., preferably about from 15 to 30° C., e.g., by using conventional water-cooled bubble cap trays, and pressures are maintained at about from 1 to 95, preferably about from 3 to 8, atmospheres, the higher pressures being employed with the higher temperatures. These preferred temperatures and pressures are typical of absorption tower operation in conventional 50–62% $HNO_3$ plants. The combination of temperature and pressure throughout the reaction zones is such that substantially all of the nitrogen peroxide is in the gaseous state, i.e., the temperatures are above the dew point of the nitrogen peroxide at the pressures employed. As in conventional absorption tower operation, an amount of molecular oxygen in excess of stoichiometric requirements is maintained in the gas stream throughout zones A and B to reoxidize NO formed during reaction of water and nitrogen peroxide.

The process of this invention has three features which are most responsible for the results achieved, viz., two acid products, one having a concentration of about from 40 to 65% $HNO_3$ and the other being stronger acid having a concentration of at least about 65% $HNO_3$. First, the gaseous feed mixture is substantially free of water, i.e., it contains less than about 1% water, by weight. Should more water be present, it would have a significant adverse effect on the strength of the stronger acid product, either directly as a diluent or by reacting with nitrogen peroxide to form weak acid, thus both diluting the product acid and reducing the nitrogen peroxide content and state of oxidation of the feed gas. Second, the gaseous feed mixture contains, by volume, at least 1%, preferably about from 5 to 10%, nitrogen oxides whose state of oxidation is at least about 95%, preferably at least about 98%. This ensures a high partial pressure of nitrogen peroxide; hence, the driving force needed to prepare strong acid. Third, the quantity and strength of the weaker acid sidestream is such that liquid flow through reaction zone A is relatively low by comparison to the gas flow, and in particular, is such that there is near-equilibrium between the gas *entering* the bottom plate of zone A and the strong acid *leaving* that plate, as contrasted with the normal situation where the leaving gas and acid are in equilibrium. This means that the strongest possible acid is being produced with a given composition and flow rate of feed gas and liquid through zone A, and that the concentration of nitrogen oxides in the gases is only slightly reduced in zone A, leaving most of such oxides for the production of nitric acid in zone B. When 65% $HNO_3$ and 40% $HNO_3$ are the desired strong and weak acids, respectively, the requisite near-equilibrium is achieved by continuously withdrawing the 40% acid at a rate sufficient to remove at least about 12% of the total moles of reactive fixed nitrogen fed to the absorption system. This means that the ratio of gross liquid flow rate in stream 9 to that in stream 10 is at least about 0.23:1. To prepare acid stronger than 65%, more than about 12% of the reactive fixed nitrogen would have to be withdrawn as 40% acid or the strength of the sidestream product increased. Thus, as the difference between the strength of the zone B product and that desired for the zone A strong acid increases, so must the quantity of zone B product that is withdrawn from the system as sidestream 9. Overall, employing feed gases having higher states of oxidation, higher volume percentages of nitrogen peroxide and lower water contents, and using higher ratios of gas to liquid in zone A give stronger zone A products. Also, production of stronger acid is favored by lower temperatures and higher pressures.

From the standpoint of the overall economics of the process, taking into account the number of plates required in the absorption column, column pressure, the demand for $HNO_3$ having the two strengths capable of being produced, and the cost of otherwise preparing the stronger acid product, sidestream withdrawal of acid having a concentration of about from 58 to 62% and removal from zone A of about from 68 to 73% $HNO_3$ is generally preferred.

The following examples illustrate the process of the invention.

EXAMPLES 1 to 7

The following table gives steady state operating conditions for seven different runs, each carried out in an absorption column, 10.5 feet in diameter and fitted with water-cooled bubble cap trays spaced 1 foot apart. In Examples 1 to 4, 6 and 7 the column is of conventional pressure process design. However, in Example 5, the column is of heavier than normal construction to satisfy the requirements of higher pressure operation. All process streams are identified by the numbers used in the drawing. In each run, the column is operating within 2% of capacity, as previously defined; aqueous feed 8 is 25° C. water; sufficient cooling water is fed to the cooling coils in the trays to maintain the column's temperature isothermal at 25° C.; the feed gas enters the bottom 6 of the column at a temperature of 25° C.; and the pressure in the column is 90 p.s.i.g., except in Example 5, where the pressure is 500 p.s.i.g. In all examples, the values given for product streams 9 and 10 are after conventional bleaching operations to remove dissolved nitrogen oxides. The bleacher air, but not the nitrogen oxides, from the treatment of each product stream is included within the feed gas composition shown in Examples 1 to 5 and is the auxiliary air shown for Examples 6 and 7. The amount of nitrogen oxides returned to the column with the bleacher air is not shown but it substantially equals the amount originally dissolved in the product streams and, therefore, does not affect the material balance around the column. Examples 6 and 7 illustrate the mode of operation where the source of feed gas is a conventional ammonia oxidation unit, and two cuts of acid condensate are withdrawn from the cooler-condenser system by two separators 3 and pumped in two streams 4 to the plates in zone B where the acid is of the same strength as the condensate pumped in.

|  | Example | | | | | | |
|---|---|---|---|---|---|---|---|
|  | 1 | 2 | 3 | 4 | 5 | 6 | 7 |
| No. of Plates, Zone A | 18 | 6 | 9 | 12 | 45 | 8 | 16 |
| No. of Plates, Zone B (top) | 20 | 25 | 24 | 23 | 10 | 35 | 35 |
| Feed Gas 6, lbs./hr | 103,394 | 103,394 | 103,394 | 103,394 | 103,394 | 92,678 | 92,688.1 |
| Vol. Percent, $O_2$ | 4.2 | 4.2 | 4.2 | 4.2 | 4.2 | 3.1 | 2.8 |
| Vol. Percent, NO | 0.1 | 0.1 | 0.1 | 0.1 | 0.1 | 0.4 | Nil |
| $NO_2$ plus $N_2O_4$ (calcd. as $NO_2$) | 6.8 | 6.8 | 6.8 | 6.8 | 6.8 | 8.1 | 8.6 |
| $NO_2$ plus $N_2O_4$ (calcd. as $N_2$) | 88.4 | 88.4 | 88.4 | 88.4 | 88.4 | 91.6 | 91.0 |
| Wt. Percent, $H_2O$ | 0.4 | 0.4 | 0.4 | 0.4 | 0.4 | 0.2 | 0.2 |
| Percent State of Oxidation | 98 | 98 | 98 | 98 | 98 | 95 | 99.8 |
| Feed $H_2O$ 8, lbs./hr | 11,410.5 | 10,568 | 9,934 | 9,406.5 | 8,299 | 6,089.6 | 5,712.5 |
| Acid Feed 4 to Zone B:[1] |  |  |  |  |  |  |  |
| To Plate No. 5, lbs./hr |  |  |  |  |  | 1,856.4 | 1,856.4 |
| Percent $HNO_3$ |  |  |  |  |  | 54.6 | 54.6 |
| To Plate No. 16, lbs./hr |  |  |  |  |  | 12,698 | 12,698 |
| Percent $HNO_3$ |  |  |  |  |  | 35 | 35 |
| Total Feed Reactive Fixed N, moles | 242.9 | 242.9 | 242.9 | 242.9 | 242.9 | 347.2 | 347.2 |
| Auxiliary Air 12, lbs./hr |  |  |  |  |  | 9,455 | 9,450 |
| Product $HNO_3$ 9, lbs./hr | 6,296 | 14,880 | 9,504 | 5,026.5 | 14,590 | 26,709 | 26,704 |
| Percent $HNO_3$ | 40 | 60 | 60 | 60 | 65 | 60 | 60 |
| Percent of Reactive Fixed N fed | 16.5 | 58.7 | 37.3 | 19.7 | 62.0 | 73.3 | 75.6 |
| Product $HNO_3$ 10, lbs./hr | 18,051 | 8,624 | 13,364 | 17,313 | 6,658 | 7,705 | 7,327.8 |
| Percent $HNO_3$ | 68 | 68 | 68 | 68 | 80 | 69.4 | 73 |
| Ratio of Flow Rates 9, 10 | 0.35 | 1.73 | 0.71 | 0.29 | 2.19 | 3.47 | 3.64 |
| Tail Gas 11, lbs./hr | 90,457.5 | 90,458 | 90,460.5 | 90,461 | 90,445 | 88,420.1 | 88,418.5 |
| Vol. Percent, $O_2$ | 2.9 | 2.9 | 2.9 | 2.9 | 2.9 | 3.0 | 3.0 |
| NO plus $NO_2$ plus $N_2O_4$ [2] | 0.3 | 0.3 | 0.3 | 0.3 | 0.3 | 0.3 | 0.3 |
| Yield, Percent Reactive Fixed N in 9 plus 10 | 96.8 | 96.8 | 96.8 | 96.8 | 96.9 | 97.7 | 97.3 |

[1] Plate Nos. determined by counting from bottom plate (plate No. 1) of Zone B.
[2] The remainder of the tail gas is $N_2$ and a minor amount of entrained $H_2O$.

When aqueous nitric acid having a concentration of up to about 5% $HNO_3$ is employed as aqueous feed 8, the results are substantially the same as those illustrated above, the difference being that the number of plates in zone B of the column or the aqueous feed rate must be increased slightly to maintain the same absorption efficiency.

From the foregoing, it is also believed apparent if a need exists for more than one relatively weak nitric acid product, additional sidestreams could be withdrawn from reaction zone B provided their aggregate concentration (i.e. if the streams were mixed) is at least about 40% $HNO_3$ and if they together contain at least about 12% of the reactive fixed nitrogen fed to the reaction zones.

We claim:

1. In a process for preparing aqueous nitric acid by countercurrently absorbing gaseous nitrogen peroxide in water in an absorption system operating at a temperature and pressure of about from 5 to 50° C. and 1 to 95 atmospheres, respectively, and above the dew point of the nitrogen peroxide, said nitrogen peroxide being provided by a gaseous mixture initially containing, by weight, less than about 1% $H_2O$ and, by volume, at least 1% nitrogen oxides whose state of oxidation is at least about 95%, the improvement which comprises continuously:

(A) withdrawing aqueous nitric acid having a concentration of about from 40 to 65% $HNO_3$ from an intermediate portion of the absorption system at a rate sufficient to remove continuously at least about 12% of the total moles of reactive fixed nitrogen fed to the absorption system, said concentration and rate together being sufficient to permit the acid withdrawal of step (B); and (B) simultaneously withdrawing from a downstream portion of the absorption system, aqueous nitric acid having a concentration of at least about 65% $HNO_3$ and containing up to about 88% of said reactive fixed nitrogen, said acid being stronger than the acid withdrawn in step (A) and stronger than can be produced in the same absorption system from the same quantity of reactive fixed nitrogen when such system is operating at the same temperature and pressure and with the same efficiency, but with withdrawal from the system of only one strength of aqueous nitric acid.

2. A process of claim 1 wherein the products withdrawn in steps (A) and (B) together contain at least 94% of said fixed nitrogen.

3. A process of claim 1 wherein the acid withdrawn in step (A) has a concentration of about from 58 to 62% $HNO_3$, the acid removed in step (B) has a concentration of about from 68 to 73% $HNO_3$, and these two products together contain at least about 96% of said fixed nitrogen.

4. A process of claim 3 wherein the gaseous mixture initially contains, by volume, about from 5 to 10% nitrogen oxides whose state of oxidation is at least about 98%, and the temperatures and pressures within the reaction zones are about from 15 to 30° C. and 1 to 8 atmospheres, respectively.

5. A process of claim 4 wherein about 60% $HNO_3$ is withdrawn in step (A) and about 68% $HNO_3$ is removed in step (B).

References Cited

UNITED STATES PATENTS

| | | | |
|---|---|---|---|
| 1,952,633 | 3/1934 | Shapleigh | 23—160 |
| 2,032,684 | 3/1936 | Chinnock | 23—161 |
| 2,088,057 | 7/1937 | Handforth | 23—160 |
| 2,132,663 | 11/1938 | Voogel | 23—160 |

OTHER REFERENCES

Chilton, Thomas H.: Chemical Engineering Monograph Series; vol. 3, No. 56, published by The American Institute of Chemical Engineers; New York 1960.

OSCAR R. VERTIZ, Primary Examiner
G. O. PETERS, Assistant Examiner